(12) United States Patent
Krithivas et al.

(10) Patent No.: US 10,116,518 B2
(45) Date of Patent: *Oct. 30, 2018

(54) MECHANISM FOR MANAGEMENT CONTROLLERS TO LEARN THE CONTROL PLANE HIERARCHY IN A DATA CENTER ENVIRONMENT

(71) Applicant: Intel Corporation, Santa Clara, CA (US)

(72) Inventors: Ramamurthy Krithivas, Chandler, AZ (US); Narayan Ranganathan, Bangalore (IN); Mohan J. Kumar, Aloha, OR (US); John C. Leung, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/599,087

(22) Filed: May 18, 2017

(65) Prior Publication Data
US 2017/0257277 A1    Sep. 7, 2017

Related U.S. Application Data

(63) Continuation of application No. 14/494,892, filed on Sep. 24, 2014, now Pat. No. 9,686,143.

(51) Int. Cl.
*H04L 12/24* (2006.01)
*H04L 12/855* (2013.01)
*H04L 29/12* (2006.01)

(52) U.S. Cl.
CPC ............ *H04L 41/12* (2013.01); *H04L 41/044* (2013.01); *H04L 47/2466* (2013.01); *H04L 61/2015* (2013.01); *H04L 61/2507* (2013.01)

(58) Field of Classification Search
CPC ... H04L 41/12; H04L 41/044; H04L 47/2466; H04L 61/2015; H04L 61/2507
See application file for complete search history.

(56) References Cited

U.S. PATENT DOCUMENTS

| | | | | |
|---|---|---|---|---|
| 2009/0083406 A1* | 3/2009 | Harrington | ............. | G06F 15/16 709/222 |
| 2010/0281159 A1* | 11/2010 | Boscolo | .................. | H04L 63/20 709/224 |

* cited by examiner

*Primary Examiner* — Brian J. Gillis
*Assistant Examiner* — Chhian Ling
(74) *Attorney, Agent, or Firm* — Law Office of R. Alan Burnett, P.S (57) ABSTRACT

Mechanisms to enable management controllers to learn the control plane hierarchy in data center environments. The data center is configured in a physical hierarchy including multiple pods, racks, trays, and sleds and associated switches. Management controllers at various levels in a control plane hierarchy and associated with switches in the physical hierarchy are configured to add their IP addresses to DHCP (Dynamic Host Control Protocol) responses that are generated by a DCHP server in response to DCHP requests for IP address requests initiated by DHCP clients including manageability controllers, compute nodes and storage nodes in the data center. As the DCHP response traverses each of multiple switches along a forwarding path from the DCHP server to the DHCP client, an IP address of the manageability controller associated with the switch is inserted. Upon receipt at the DHCP client, the inserted IP addresses are extracted and used to automate learning of the control plane hierarchy.

12 Claims, 7 Drawing Sheets

MECHANISM FOR MANAGEMENT CONTROLLERS TO LEARN THE CONTROL PLANE HIERARCHY IN A DATA CENTER ENVIRONMENT

RELATED APPLICATIONS

The present application is a continuation of U.S. patent application Ser. No. 14/494,892, filed on Sep. 24, 2014, entitled "MECHANISM FOR MANAGEMENT CONTROLLERS TO LEARN THE CONTROL PLANE HIERARCHY IN A DATA CENTER ENVIRONMENT", which is hereby incorporated herein by reference in its entirety and for all purposes.

BACKGROUND INFORMATION

In recent years, implementation of "cloud-based" services, high-performance computing (HPC) and other activities employing data centers and the like have seen widespread adoption. Under a typical data center installation, a large number of servers installed in server chassis and server racks are interconnected in communication using network links (e.g., Ethernet) and various switching mechanisms, such as switch blades/modules and "top-of-rack" (ToR) switches. In some installations, additional links, such as InfiniBand or Fibre Channel, may used for storage and other purposes.

Data centers commonly employ a physical hierarchy of compute, network and storage shared resources to support scale out of workload requirements. The de facto control plane to manage such compute, networking and storage shared resource is Ethernet and the network protocol for manageability is TCP/IP based. Each shared resource typically has a management controller to provide manageability access point and addressed via IPv4 or IPv6 addresses. Data centers generally implement VLANs (Virtual Local Area Networks) to separate control plane traffic from the data plane traffic.

A hierarchical architecture for the controllers in the control plane is required to prevent multiple management agents from providing conflicting commands to a management controller. For example, an Application Performance manager wants a Sled controller to turbo-up node power, but a Tray level power manager wants to limit tray level power consumption at the current levels.

Currently, there is no automated mechanism available to discover management controller hierarchy, even when a physical containment hierarchy is well defined. It is highly desired that each management controller in the controller hierarchy automatically "learn" of all controllers in its chain of command both at higher and optionally lower levels. This is a fundamental requirement to coordinate manageability actions.

The controller hierarchy can be established within a limited physical scope using separate physical connectivity. Such an approach imposes hardware requirements and is not scalable to support dense form factor requirements of today's data center.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of mechanisms to enable management controllers to learn the control plane hierarchy in data center environments are described herein. In the following description, numerous specific details are set forth to provide a thorough understanding of embodiments disclosed and illustrated herein. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described herein, software-based mechanisms are provided that facilitate automated learning of the control plane hierarchy in data centers and the like. The mechanisms leverage conventional DHCP (Dynamic Host Control Protocol) techniques for allocating IP (Internet Protocol) addresses to DHCP clients in the data center, including management controllers and compute and storage nodes by inserting management controller hierarchy information in DHCP responses issued from a DHCP server. Moreover, the mechanisms are implemented in a manner that is transparent to the compute and storage nodes.

Figure 1:
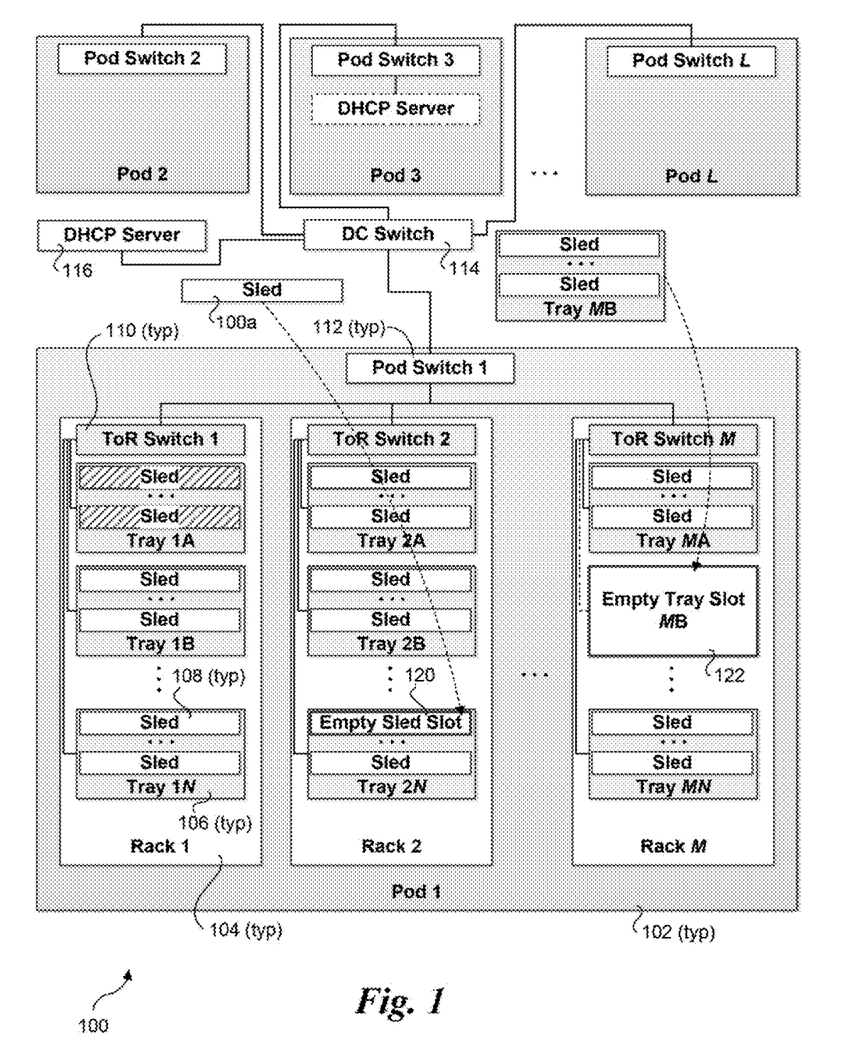
FIG. 1 is a schematic block diagram illustrating a data center physical hierarchy including pods, racks, trays, and sleds'

As discussed above, data centers commonly employ a physical hierarchy of compute, network and storage shared resources to support scale out of workload requirements. FIG. 1 shows a portion of a data center 100 an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc.

Depicted at the top of each rack 104 is a respective TOR switch 110, which is also labeled by TOR Switch number. Generally, TOR switches 110 are representative of both TOR switches and any other switching facilities that support switching between racks 104. It is conventional practice to refer to these switches as TOR switches whether or not they are physically located at the top of a rack (although they generally are).

Each Pod 102 further includes a pod switch 112 to which the pod's TOR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hexarchies that use physical LANs. In practice, it is common to deploy virtual LANs using underlying physical LAN switching facilities.

Data center 100 further includes a DHCP (Dynamic Host Control Protocol) server 116 that is configured to allocate and manage IP addresses. For simplicity, Pod 1 depicts a DHCP server 116 connected directly to DC switch 114. Generally, the DHCP server may be hosted by a stand-alone server or may be hosted on one of the compute nodes in one of the pods that is connected to a DC switch through one or more switch layers in the hierarchy. Under other configurations, a respective DHCP server may provide DHCP functions for each pod or a group of pods. As another option, multiple DHCP servers may operate in a distributed manner to implement DHCP operations for a domain or sub-domain spanning multiple pods.

In order to communicate with other compute nodes and resource hosts in the data center, each compute or storage hosts (collectively referred to compute nodes and storage nodes herein) needs to have a unique address in accordance with the communication protocol used for the data center network (noting that different portions of a data center may employ different network protocols). In the embodiments herein, the network protocol is Ethernet, and the network layer protocol used is IP (Internet Protocol). As discussed above, IP traffic in data centers typically employs Transmission Control Protocol (TCP) at the transport layer to confirm delivery of transferred data using the widely-used TCP/IP protocol.

DHCP is a standardized networking protocol used IP networks for dynamically distributing network configuration parameters, such as IP addresses. Under DHCP, DHCP clients, such as computers on enterprise LANs and compute nodes in data centers) request IP addresses and networking parameters automatically from a DHCP server, reducing the need for a network administrator or a user to configure these settings manually.

DHCP is very common and used across a wide variety of networks ranging in size from home networks to large campus networks and regional Internet service provider networks, as well as data centers. Most residential network routers receive a globally unique IP address within the provider network. Within a local network, DHCP assigns a local IP address to devices connected to the local network. When a computer or other networked device connects to a network, its DHCP client software (e.g., in a host operating system) sends a broadcast query requesting necessary information. Generally, any DHCP server on the network may service the request. The DHCP server manages a pool of IP addresses and information about client configuration parameters such as default gateway, domain name, the name servers, and time servers. On receiving a request, the server may respond with specific information for each client, as previously configured by an administrator, or with a specific address and any other information valid for the entire network, and the time period for which the allocation (lease) is valid. A host typically queries for this information immediately after booting, and periodically thereafter before the expiration of the information. When an assignment is refreshed by the DHCP client, it initially requests the same parameter values, but may be assigned a new address from the server, based on the assignment policies set by administrators.

Generally, a given IP domain may employ either IPv4 (Internet Protocol Version 4) or IPv6 (Internet Protocol Version 6) addresses. IPv4 uses a 4-octet address, while IPv6 uses a 6-octet address. Many environments use a mixture of DHCP-allocated and pre-assigned IPv4 or IPv6 addresses. In the case of data centers, much of the data center may be on standby or shutdown entirely during parts of the day (e.g., nights). "Sleeping" nodes may retain the DHCP-allocated addresses, while shutting down a node necessitates requiring a new DHCP address when restarted.

The most common situations where DHCP addresses are allocated are 1) whenever a compute or storage node is brought back up and requires a new IP address (after being shutdown or in a sleep state under which its DHCP lease is explicitly released or expires; 2) when a sled is installed in a tray; and 3) when a tray is installed. As will be discussed in further detail below, under some architecture a sled may have a share a single network interface (and corresponding IP address) across multiple compute units that are operated (from a network standpoint) as a single compute node. In addition, some sleds may support multiple compute nodes having separate network interfaces and thus requiring a separate IP address for each compute node.

FIG. 1 depicts a sled 108a being installed in an empty sled slot 120 in Tray 2N. Also depicted is a Tray MB being installed into an empty Tray Slot 122. FIG. 1 also shows the sleds in Tray 1A in cross-hatch, indicating they are currently offline. When sled 108a is installed into empty sled slot 120, it is initialized, which include obtaining an IP address from DHCP server 116. Similarly, when Tray MB is installed in empty tray slot 122, both the tray itself and each of its sleds are initialized, which results in requesting IP addresses from DHCP server for each of the Tray MB and its sleds. Each of the sleds in Tray 1A also will request an IP address from DHCP server 116 when they are brought back on-line.

Figure 2:
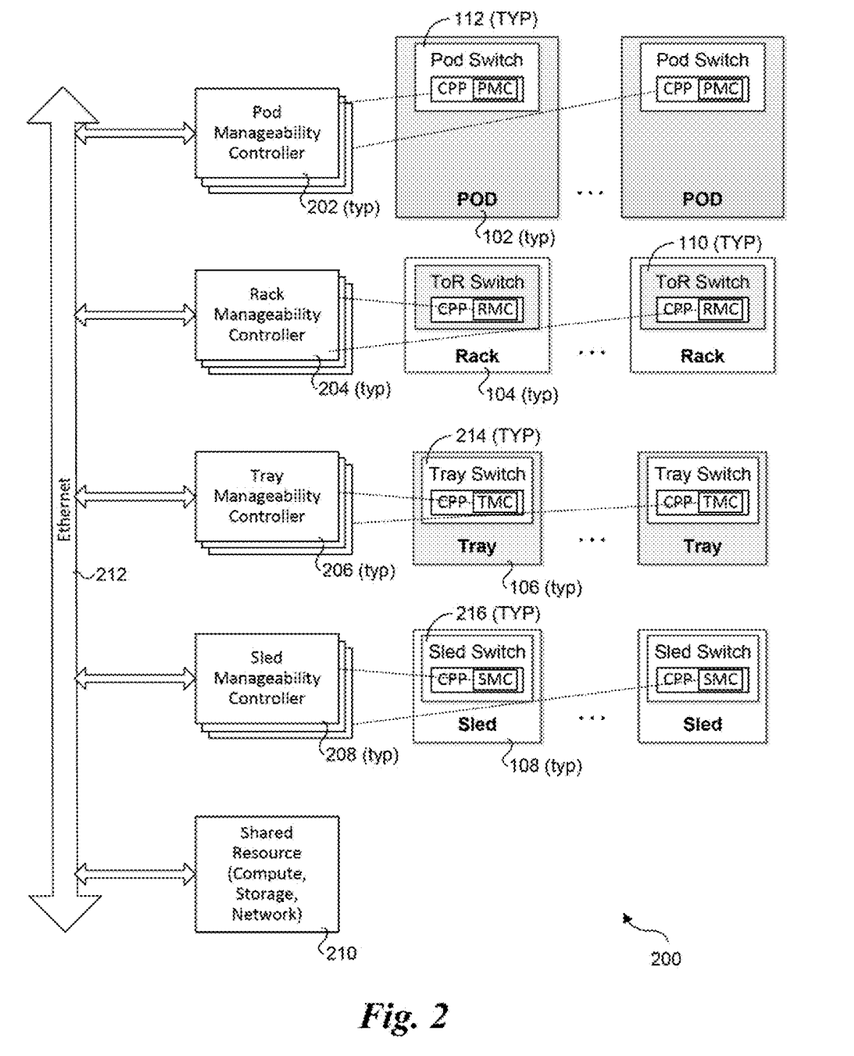
FIG. 2 is a diagram illustrating a control plane hierarchy implemented in the data center physical hierarchy of FIG. 1.

FIG. 2 shows an exemplary management hierarchy 200 used for managing various resources in data center 100. At the top of management hierarchy 200 are pod manageability controllers (PMCs) 202, followed by rack manageability controllers (RMCs) 204, tray manageability controllers (TMCs) 206, and sled management controllers (SMCs) 208.

Each of the PMCs 202, RMCs 204, TMCs 206 and SMCs 208, along with shared resources 210, is coupled to an Ethernet network 212.

As further illustrated in FIG. 2, each pod 102 has a PMC 202 that is used for performing manageability aspects relating to operation of that pod. Similarly, each rack 204 includes an RMC 204 for performing manageability aspects relation to operation of that rack, each tray 106 includes a TMC 206 for performing manageability aspects relating to the operation of that tray, and each sled 106 includes an SMC 208 for performing manageability aspects relation to operation of that sled.

Each PMC 202, RMC 204, TMC 206 and SMC 208 includes its own network interface (e.g., network adapter or network interface controller (NIC)), and its own logic for implementing its functionality and operations. Various types of architectures may be used for implementing the PMCs, RMCs, TMCs, and SMCs, and such architectures need not be the same at the different levels in the hierarchy. For example, a PMC might be implemented as a stand-alone server, while an RMC might be implemented via a server blade or server module in a rack. Meanwhile, a TMC could be implemented via an embedded processor or the like in a tray assembly, while an SMC could be implemented via an embedded processor or the like in a sled.

As discussed above, each node in the data center needs to have its own IP address. In addition to the compute nodes, each PMC 202, RMC 204, TMC 206 and SMC 208 also needs to acquire its own IP address. In one embodiment, this is accomplished through DHCP server 116. Accordingly, DHCP requests are initiated by both management controllers as well as the compute or storage nodes.

The DHCP response for each DHCP request, generated by the DHCP server, will traverse the network by going through one or more network switches, until it is received by the originating element which could be a management controller or compute/storage node. As explained in further detail below, each network switch may be configured by its management controller to insert its IP address information into the DHCP response packet. Therefore when a management controller receives its DHCP response it contains the IP address of all management controllers higher in the hierarchy.

The lowest management controller requests its associated network switch to retrieve the entries inserted by the previous management controller and remove the information from the DHCP response packet. Therefore when a compute or storage node receives its DHCP response it looks identical to the packet generated by the DHCP server. Each management controller based on the IP address of any incoming command can selectively decide whether to honor the request or reject the command, thus establishing a hierarchy- and policy-based command response. All of this is performed in a manner that is transparent to the compute and storage nodes, such that they are completely oblivious to the operations being performed by the management controllers.

Figure 3:
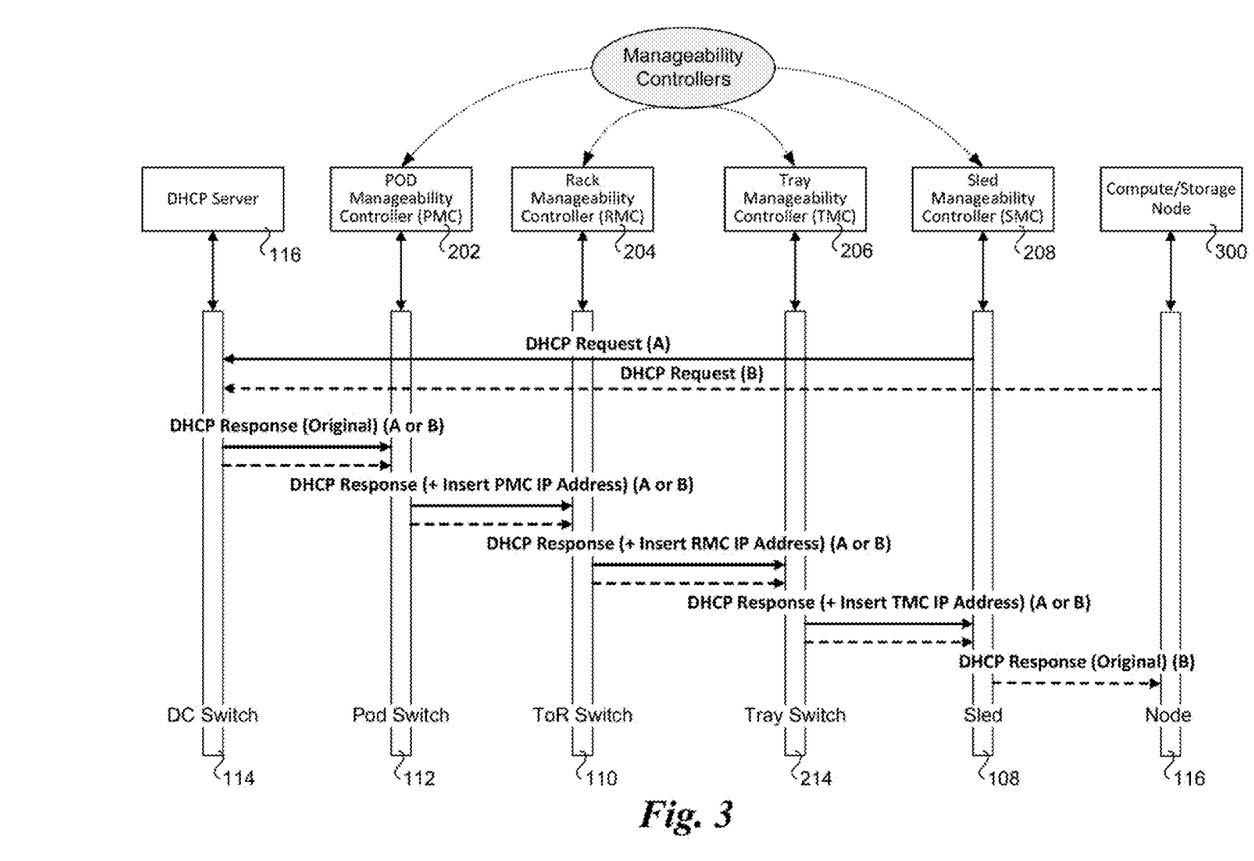
FIG. 3 is a message flow diagram illustrating insertion of manageability controller IP addresses in a DHCP response that is used to automate knowledge of a control plane hierarchy in a data center having a sled manageability controller at its lowest level.

The foregoing operations are illustrated in the message flow diagram of FIG. 3, while corresponding operations and logic are depicted in a flowchart 400 of FIG. 4. FIG. 3 shows two DHCP requests (A and B), with respective DHCP responses. The DHCP request A originates for an SMC 208, while DHCP request B originates from a compute or storage node 300.

Prior to sending a DHCP request, a DHCP client broadcasts a DHCP discovery messages using a either a destination address of 255.255.255.255 (for IPv4) or a specified subnet broadcast address. For example, a DHCP client that has lost its lease may send a discovery message using the IP address of the DHCP server it used previously. The DHCP discovery message, which is sent using UDP, is an IP address lease request that includes the hardware (MAC) address of the client, but since the client has yet to be allocated an IP address the client IP address is 0x00000000. In response to the DHCP discovery message, the DHCP server reserves an IP address and makes a lease offer by sending a DHCP offer message to the client. This message includes the client's MAC address, the IP address that the server is offering, the subnet mask, the lease duration, and the IP address of the DHCP server making the offer.

In response the DHCP offer, the client replies with a DHCP request, which again is broadcast to the server, requesting the offered IP address. In response to receiving a DHCP offer, the DHCP server returns a DHCP Acknowledgement (ACK). As used herein, the DHCP ACK message is also referred to a DHCP response to a DHCP request message.

As a DHCP request is received at each upstream switch in the hierarchy, in sequence, it is forwarded to the next switch until it reaches the switch to which the DHCP server is connected (or via which the DHCP server is reachable). As shown in FIG. 3 for DHCP request A, the DHCP request originates at an SMC 208 and is forwarded via a tray switch 214 (for the tray the sled is installed in), a TOR switch 110 (for the rack SMC 208 is installed in), a pod switch 112 (for the pod associated with the rack), eventually before forwarded to DC switch 114, which forwards the request to DHCP server 116. Under a sled/tray/rack/pod architecture, each switch will typically be configured to implement a single upstream port (a.k.a. uplink port) that is used for all upstream traffic. This switch hierarchy coincides with the management controller hierarchy, which is an inherent feature that is advantageously used by the embodiments herein to automatically discovery a management controller hierarchy configuration information.

In response to receiving DHCP request A, DCHP server 116 generates a DHCP response A (e.g., a DHCP ACK) in its original format having a destination address of SMC 208. The DHCP response will thus be forwarded along the same switch path as the DHCP response, but this time in reverse order. When traversing the path toward the DHCP client, each switch appends the respective management controller's IP address to the message until the message reaches the lowest manageability controller in the hierarchy, at which point the switch IP addresses are extracted.

Figure 4A:
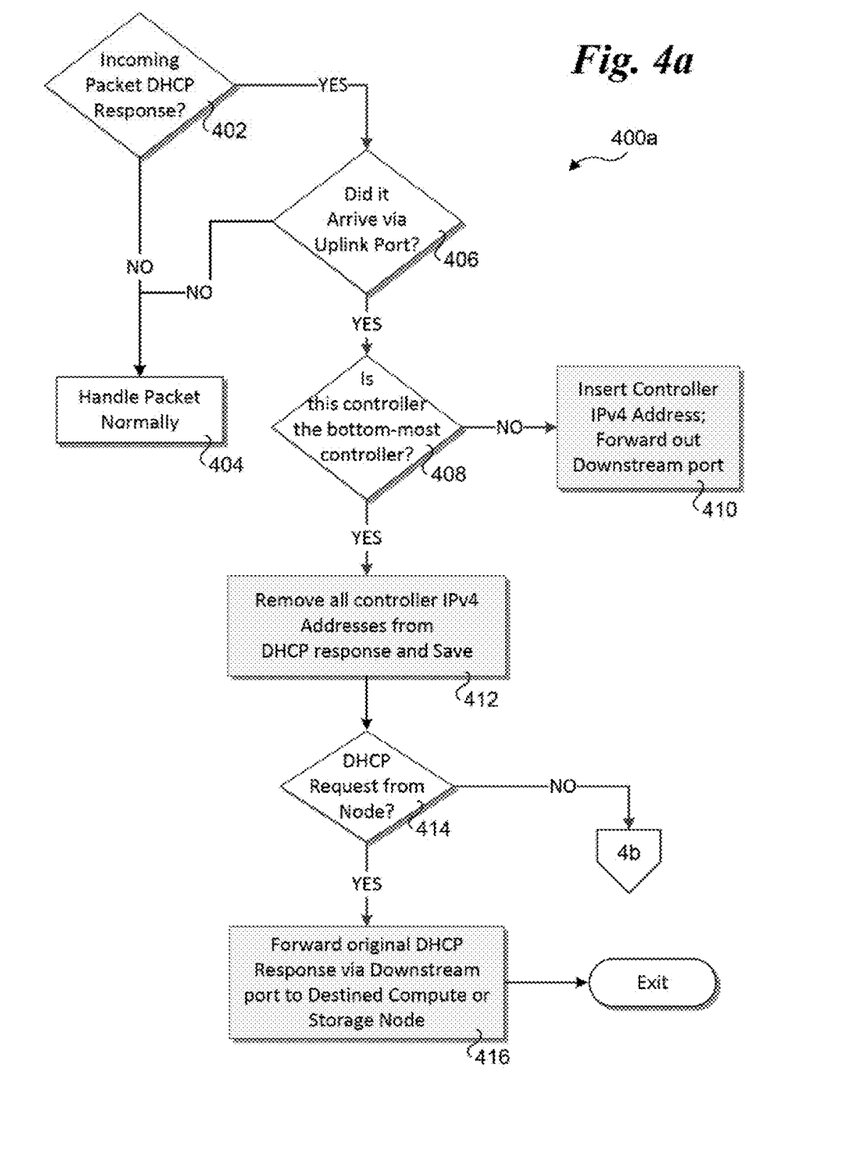
FIG. 4a is a flowchart illustrating operations and logic performed by switches and associated manageability controllers to implement message flow diagram of FIG. 3

With further reference to flowchart 400a of FIG. 4a, the operations proceeds as follows. First, in a decision block 402, a determination is made to whether the incoming packet that is received at a given switch in the hierarchy is a DHCP response (i.e., DHCP ACK packet). If the answer is NO, then the packet is handled in the normal manner, with no additional operations being performed, as depicted by the logic flowing to a block 404. If the answer to decision block 402 is YES, the logic proceeds to a decision block 406 in which a determination is made to whether the packet arrived via an uplink port. If not, the logic proceeds again to block 404. However, in most instances the answer to decision block 406 will be YES, resulting in the logic proceeding to a decision block 408 in which a determination is made to whether the switch is associated with the bottom most controller (i.e., the lowest management controller in the hierarchy).

In the answer to decision block 408 is no, the controller's IPv4 address is inserted into the DHCP ACK packet, and the packet is forwarded out of the switch's downstream port via which the DHCP client can be reached. In one embodiment, the IPv4 address is inserted into a portion of the packet comprising 192 octets following the client hardware address field. In another embodiment, one of the standard DHCP option fields is repurposed to include the IPv4 addresses that are added by the switches in the hierarchy as they are traversed by the DHCP response. For example, a standard field that is rarely in a data center used may be repurposed, such as a log server, a cookie server, and Impress server, etc. Each of these fields is configured to store the IP addresses of one or more servers, in sequence.

As shown in FIG. 3, as DHCP response A reaches each of pod switch 112, TOR switch 110, and tray switch 214, the switch's associated manageability controller's IP address is added to the DHCP response packet. At pod switch 112, the IP address of PMC 202 is added; at TOR switch 110, the IP address of RMC 204 is added; and at tray switch 214 the IP address for TMC 206 is added.

Upon DHCP response A being received at sled switch X, the result of decision block 408 is YES, since SMC 208 is the lowest manageability controller in the hierarchy. The flowchart logic thus proceeds to a block 412 in which all of the IPv4 addresses added by the management controllers up the hierarchy are removed from the DHCP response and saved.

In a decision block 414, a determination is made to whether the DHCP request originated from a compute or storage node, or originated from a manageability controller. For DHCP request A, the answer is NO, and the process proceeds to the section of the flowchart 400b on FIG. 4b. Since DHCP request B originated from a computer or storage node 300, the DHCP response's destination is this node, which results in the answer to decision block 414 being YES, and the logic proceeding to a block 416 in which the DHCP response in its original form is forwarded via a downstream port to the applicable compute or storage node, completing the process.

In order to allow management controllers higher up in the hierarchy to identify lower level controllers as they are added to the hierarchy, a voluntary notification mechanism may be implemented to inform each controller in the hierarchy of the changes below its level. In one embodiment, each time a manageability controller make a DHCP request and receives a corresponding DHCP response addressed to that controller, the controller sends a notification, including its IP address, to each of the controllers above it that added a manageability controller IP address to the DHCP response.

Figure 4B:
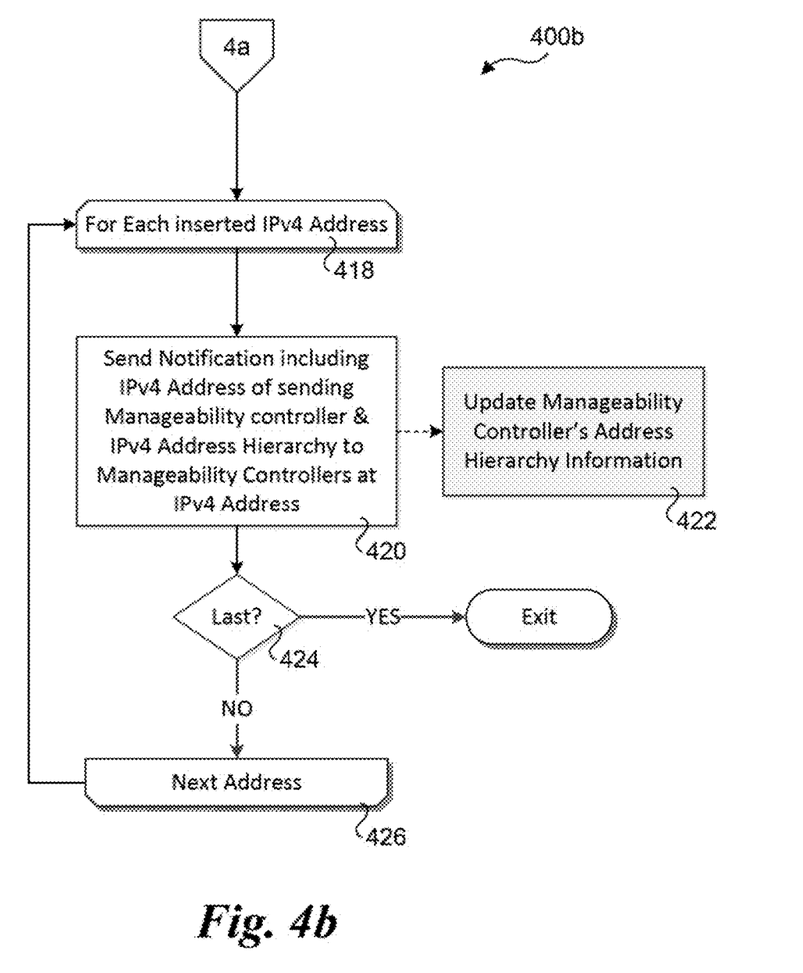
FIG. 4b is a flowchart illustrating operations performed by a lowest manageability controller in a hierarchy to distribute management controller hierarchy information that is gathered via the DCHP response.

One embodiment for implementing the notifications messages is shown in flowchart 400b of FIG. 4b. As indicated by start and loop blocks 418 and 426 and a decision block 424, the operations of blocks 420 and 422 are performed for each IPv4 address that was inserted into the DHCP response before it arrived at the destination manageability controller. In block 420, a notification is generated that includes the IPv4 address of the sending controller (which can simply be included via the source address field) and the list of IPv4 addresses that were added by the manageability controllers further up the hierarchy in connection with forwarding the DHCP response. In one embodiment, a notification containing a list of all of the IP addresses that were added to the DHCP response is sent to each manageability controller. Alternatively, a notification to a given manageability controller may contain only the IP addresses of manageability controllers below that manageability controller in the hierarchy. As shown in block 422, in response to receiving the notification, each manageability controller will update its address hierarchy information, which will add the new manageability controller to the address hierarchy information for each manageability controller above the new controller.

Figure 5:
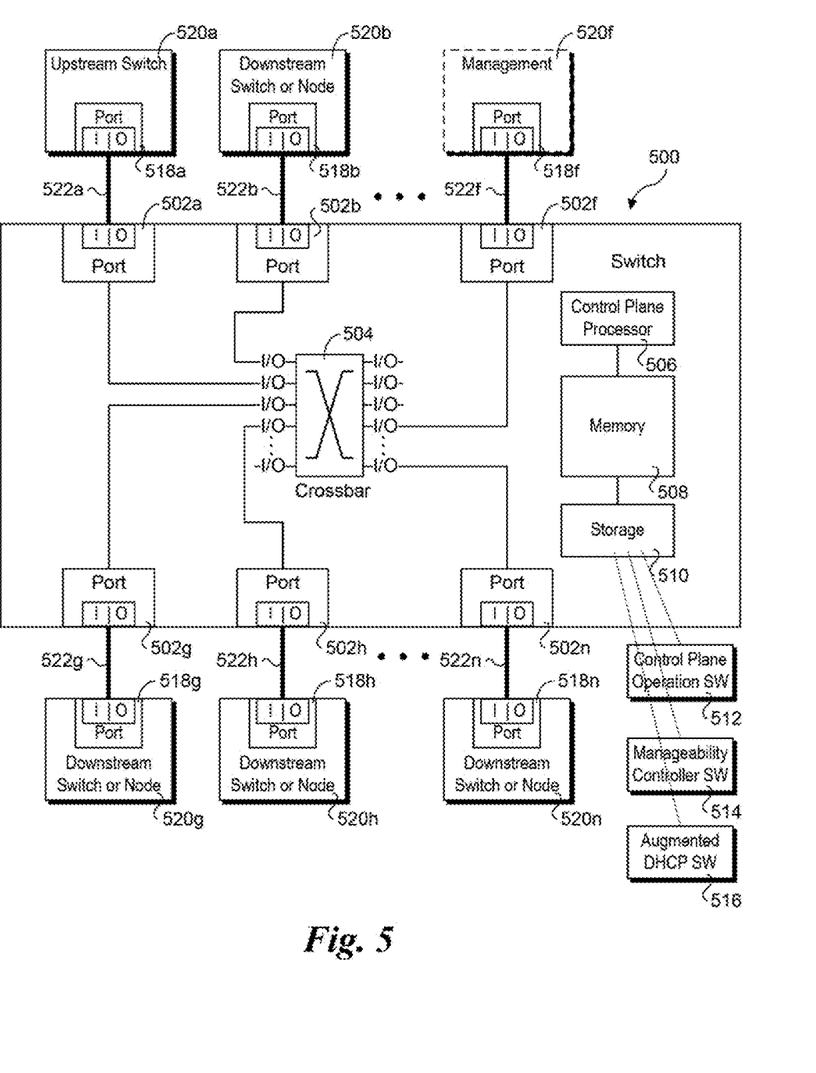
FIG. 5 is a schematic block diagram of a switch including augmented DHCP software for implemented aspects of the message flow diagram of FIG. 3, according to one embodiment.

FIG. 5 shows a block diagram of a switch 500 that may be used for one or more of pod switch 112, TOR switch 110, tray switch 214 or sled switch 216. Switch 500 includes n ports 502a-502n, which are generally referred to herein as a port 502. Each port 502 includes in input port 'I' and an output port 'O'. Each of ports 502a-502n is connected to a crossbar 504, which is used to depict interconnect circuitry within switch 500 to enable data to be forwarded between input and output ports of switches 502a-502n. It is noted that in addition to the interconnect circuitry, various buffers and other logic (both not shown) are implemented within switch 500 to facilitate various aspects of network switch operations, as will be recognized by those skilled in the networking arts. These operations are further facilitated through the use of a control plane processor 506, memory 508, and various software modules configured to be executed on control plane processor 506 that are stored in a storage device 510. In the illustrated embodiment, these software modules include control plane operation software (SW) 512, manageability controller software (SW) 514 and augmented DHCP software 516. Generally, control plane processor 506 is illustrative of various types of processors, including single core and multi-core general purpose or special-purpose processors, as well as embedded processors. While memory 508 is shown as a single block, it may be distributed. In addition, memory address ranges in memory 508 comprise one or more memory-mapped IO (MMIO) address spaces used by switch 500.

As further shown in FIG. 5, each of ports 502a-502n is connected to a respective port 518a-518n on a respective switch or node 520a-520n via a respective link 522a-522n. Each of these nodes is representative of another component in data center 100, such as another switch, compute node or storage node, or a management entity. As illustrated, ports 502a-502n are configured such that port 502a is an upstream (or uplink) port connected to an upstream switch, port 502f is an optional management port connected to a management entity, while the remaining ports are downstream (or downlink) ports connected to a downstream switch or compute/storage node, depending on the level in the hierarchy switch 500 is implemented.

Control plane operations software 512 and manageability controller software 514 comprises instructions (configured as one or more modules or an embedded application, for example) configured to be executed by control plane processor 506 to effect TCP/IP control plane operations and manageability controller operations for the applicable manageability hierarchy level switch 500 is implemented at. For example, if switch 500 is implemented in a pod switch 112, manageability controller software 510 will be configured to implement pod manageability controller 202 functionality.

Augmented DHCP software 516 is depicted separately to illustrate an augmentation to conventional manageability controller software to effect the operations relating to the DHCP response messages described herein. Again, augmented DHCP software 516 will depend on the level in the control plane hierarchy switch 500 is implemented at. For example, is switch 500 is implemented at the lowest level in the hierarchy, then augmented DHCP software 512 will be configured to perform all of the operation shown in flowcharts 400a and 400b. Meanwhile, if switch 500 is implemented above this level in the hierarchy, than augmented DHCP software need only perform the operations of decision blocks 402, 406 and 408 and blocks 404 and 410 of flowchart 400a.

Generally, aspects of switch 500 may be implemented in a switch including physical switch ports (e.g., ports to which wired or optical Ethernet cables are connected), or switch 500 may be implemented as a System on a Chip (SoC) or as a chipset on a mezzanine board or the like. For example, in some embodiments switch 500 may be implemented on a mezzanine board in a tray or sled using a disaggregated switch architecture. Under one embodiment, the disaggregated switch architecture employs conventional Ethernet physical uplinks using a standardized Ethernet physical layer (PHY), while downlinks are implemented using Ethernet over a PCIe (Peripheral Component Interconnect Express) PHY. In cases where switch 500 is implemented as an SoC or chipset, the various software modules may be considered as one or more of embedded software or firmware.

In addition to the control plane hierarchy including a pad manageability controller, rack manageability controller, tray manageability controller, and sled manageability controller, the principles and teachings of the embodiments disclosed herein may be applied to other control plane hierarchies in a similar manner. For example, the top level of the hierarchy could be a manageability controller associated with a switch above the pod level.

Figure 3A:
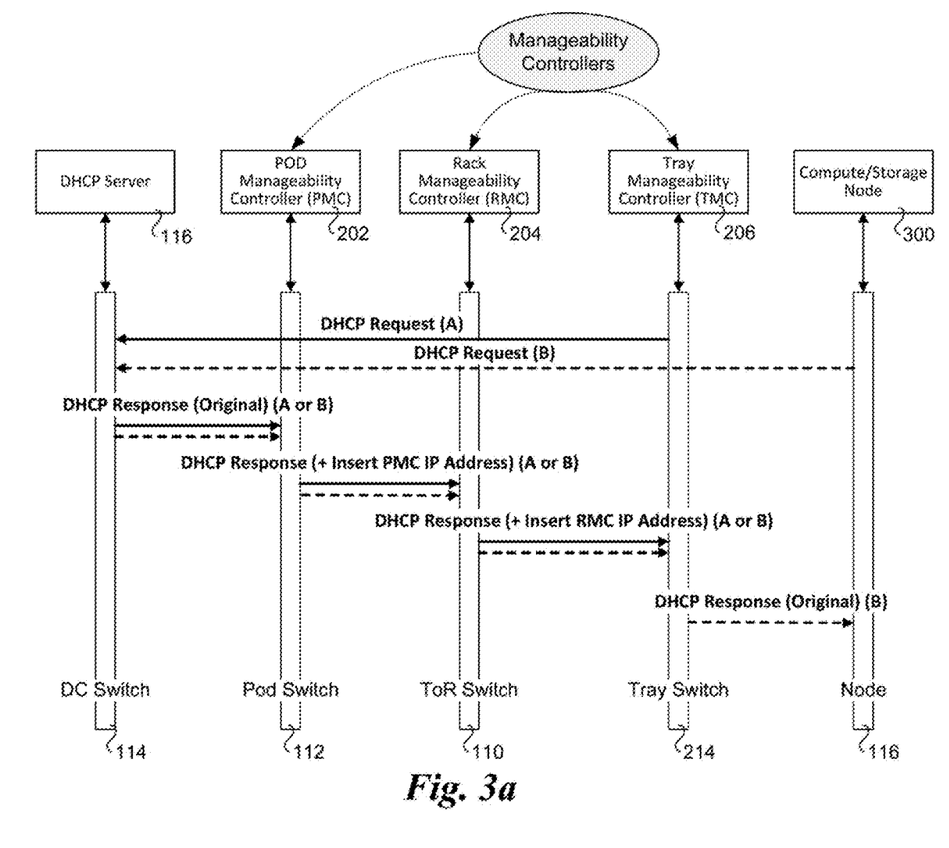
FIG. 3a is a message flow diagram illustrating insertion of manageability controller IP addresses in a DHCP response that is used to automate knowledge of a control plane hierarchy in a data center having a tray manageability controller at its lowest level.

In one embodiment, sleds do not include switches nor sled manageability controllers, and compute and/or storage nodes in the sleds are coupled to a tray switch. Accordingly, the control plane hierarchy includes pad manageability controllers, rack manageability controllers, and tray manageability controllers. As shown in FIG. 3a, the operation of the tray manageability controllers is similar to the operation of the sled manageability controller shown in FIG. 3.

The automated control plane hierarchy learning mechanisms disclosed herein provide significant advantageous over conventional techniques. Since they are software-based, they may be implemented without imposing any hardware-based modifications to existing elements in the data center. They are also completely scalable to support data centers of any size. Another advantage is they add very little overhead to existing DHCP operations and are implemented in a manner that is completely transparent to compute and storage nodes in the data center.

Further aspects of the subject matter described herein are set out in the following numbered clauses:

1. A method comprising:
receiving a DHCP (Dynamic Host Control Protocol) response message at a first switch in a data center hierarchy, the DHCP response issued from a DHCP server in response to a DHCP request made by a requesting DHCP client and including a destination address of the requesting DHCP client, wherein the first switch comprises a current switch;
inserting an IP (Internet Protocol) address corresponding to a manageability controller associated with the current switch to the DHCP response;
forwarding the DHCP response to a next downstream switch in a forwarding path toward the destination address of the requesting DHCP client, the next downstream switch becoming a new current switch;
if the DHCP client comprises a manageability controller;
repeating operations a) and b) until the DHCP response is received at a switch associated with the manageability controller; and
extracting the IP addresses added by the manageability controllers in operation a); and
updating control plane hierarchy information for the manageability controller with the IP addresses appended to the DHCP response.

2. The method of clause 1, wherein the DHCP client comprises one of a compute node or storage node, the method further comprising:
repeating operations a) and b) until the DHCP response is received at a switch coupled to the compute node or storage node;
removing the IP addresses appended to the DHCP response; and
forwarding the DHCP response to the compute or storage node.

3. The method of clause 1 or 2, further comprising:
sending a notification from the manageability controller comprising the DHCP client to each manageability controller that added its IP address to the DHCP response, each notification including at least the IP addresses for manageability controllers occupying a level in the hierarchy below the level occupied by the manageability controller to which the notification is sent.

4. The method of any of the proceeding clauses, wherein the lowest-level switch in the data center hierarchy comprises a sled switch.

5. The method of any of the proceeding clauses, wherein the lowest-level switch in the data center hierarchy comprises a tray switch.

6. The method of any of the proceeding clauses, wherein the control plane hierarchy, from a higher level to a lowest-level, includes:
a pod manageability controller;
a rack manageability controller;
a tray manageability controller; and
a sled manageability controller.

7. The method of any of clauses 1-5, wherein the control plane hierarchy, from a higher level to a lowest-level, includes:
a pod manageability controller;
a rack manageability controller; and
a tray manageability controller.

8. The method of any of the proceeding clauses, wherein the DHCP response comprises a DHCP Acknowledgement (ACK) packet, and wherein the IP addresses for the manageability controllers are added to a server option field in the DHCP ACK packet defined in RFC2132.

9. The method of any of the proceeding clauses, wherein the manageability controllers are implemented as part of control plane processor operations in the switches.

10. A switch apparatus configured to be implemented in a data center environment having a physical hierarchy and in which an associated hierarchy of manageability controllers are implemented, the switch apparatus comprising:
a plurality of ports;
a processor;
memory, operatively coupled to the processor; and
a storage device having instructions stored therein that are configured to be executed by the processor to enable the switch apparatus to,
implement a manageability controller for a level in the physical hierarchy associated with the switch apparatus;
send a first DHCP (Dynamic Host Control Protocol) request to a DHCP server, the first DHCP request including an IP (Internet Protocol) address for the manageability controller offered by the DHCP server;
receive a first DHCP response forwarded via a second switch apparatus operating at a physical hierarchy level that is one level above the switch apparatus, the first DHCP response comprising an original DHCP response issued from the DHCP server and further including a respective IP address of at least one manageability controller operating at a level in the control plane hierarchy above the manageability controller of the switch apparatus that was added by that manageability controller to the original DHCP response message;

extract the respective IP address of each manageability controller that added its IP address to the original DHCP response message; and update control plane hierarchy information for the manageability controller in the switch apparatus.

11. The switch apparatus of clause 10, wherein the instructions are configured to further enable the switch to:

configure the plurality of ports into an upstream port and a plurality of downstream ports;

receive a second DHCP response message at the upstream port issued from a DHCP server in response to a second DHCP request made by a DHCP client occupying a level in the hierarchy below the switch apparatus and including a destination address of the DHCP client;

insert the IP address of the manageability controller in the second DHCP response;

determine a downstream port used to forward the second DHCP response based on the destination address of the DHCP client; and forward the second DHCP response out of that downstream port.

12. The switch apparatus of clause 10 or 11, wherein the instructions are configured to further enable the switch to:

configure the plurality of ports into an upstream port and a plurality of downstream ports;

receive a third DHCP response message at the upstream port issued from the DHCP server as an original DHCP response in response to a DHCP request made by a DHCP client comprising a compute node or storage node linked in communication with the switch apparatus via a downstream port;

remove any IP addresses that were added to the original DHCP response by management controllers operating at levels in the hierarchy above the memory controller of the switch apparatus; and forwarding the original DHCP response to the compute node or storage node.

13. The switch apparatus of any of clauses 10-12, wherein the instructions are configured to further enable the switch to:

send a notification from the manageability controller to each manageability controller that added its IP address to the first DHCP response, each notification including at least the IP addresses for manageability controllers occupying a level in the hierarchy below the level occupied by the manageability controller to which the notification is sent.

14. The switch apparatus of any of clauses 10-13, wherein the switch apparatus is implemented in a sled switch.

15. The switch apparatus of any of clauses 10-13, wherein the switch apparatus is implemented in a tray switch.

16. The switch apparatus of any of clauses 10-13, wherein the switch apparatus is implemented in a rack switch.

17. The switch apparatus of any of clauses 10-16, wherein the control plane hierarchy, from a higher level to a lowest-level, includes:
 a pod manageability controller;
 a rack manageability controller;
 a tray manageability controller; and
 a sled manageability controller.

18. The switch apparatus of any of clauses 10-16, wherein the control plane hierarchy, from a higher level to a lowest-level, includes:
 a pod manageability controller;
 a rack manageability controller; and
 a tray manageability controller.

19. The switch apparatus of any of clauses 10-18, wherein the first DHCP response comprises a DHCP Acknowledgement (ACK) packet, and wherein the IP addresses for the manageability controllers are added to a server option field in the DHCP ACK packet defined in RFC2132.

20. The switch apparatus of any of clauses 10-19, wherein the switch apparatus comprises a mezzanine board.

21. The switch apparatus of any of clauses 10-20, wherein the switch apparatus comprises a disaggregated switch having one or more uplink ports employing Ethernet over a standardized Ethernet physical layer (PHY), and a plurality of downlink ports using Ethernet over a PCIe (Peripheral Component Interconnect Express) PHY.

22. A non-transitory machine-readable medium having instructions configured to be executed by a processor in a switch apparatus configured to be implemented in a data center environment having a physical hierarchy and in which an associated hierarchy of manageability controllers are implemented, wherein the instructions, when executed, enable the switch apparatus to:

implement a manageability controller for a level in the physical hierarchy associated with the switch apparatus;

send a first DHCP (Dynamic Host Control Protocol) request to a DHCP server, the first DHCP request including an IP (Internet Protocol) address for the manageability controller offered by the DHCP server;

receive a first DHCP response forwarded via a second switch apparatus operating at a physical hierarchy level that is one level above the switch apparatus, the first DHCP response comprising an original DHCP response issued from the DHCP server and further including a respective IP address of at least one manageability controller operating at a level in the control plane hierarchy above the manageability controller of the switch apparatus that was added by that manageability controller to the original DHCP response message;

extract the respective IP address of each manageability controller that added its IP address to the original DHCP response message; and update control plane hierarchy information for the manageability controller in the switch apparatus.

23. The non-transitory machine-readable medium of clause 22, wherein the instructions are configured to further enable the switch to:

configure the plurality of ports into an upstream port and a plurality of downstream ports;

receive a second DHCP response message at the upstream port issued from a DHCP server in response to a second DHCP request made by a DHCP client occupying a level in the hierarchy below the switch apparatus and including a destination address of the DHCP client;

insert the IP address of the manageability controller in the second DHCP response;

determine a downstream port used to forward the second DHCP response based on the destination address of the DHCP client; and forward the second DHCP response out of that downstream port.

24. The non-transitory machine-readable medium of clause 22 or 23, wherein the instructions are configured to further enable the switch to:

configure the plurality of ports into an upstream port and a plurality of downstream ports;

receive a third DHCP response message at the upstream port issued from the DHCP server as an original DHCP response in response to a DHCP request made by a DHCP client comprising a compute node or storage node linked in communication with the switch apparatus via a downstream port;

remove any IP addresses that were added to the original DHCP response by management controllers operating at levels in the hierarchy above the memory controller of the switch apparatus; and forward the original DHCP response to the compute node or storage node.

25. The non-transitory machine-readable medium of any of clauses 22-24, wherein the instructions are configured to further enable the switch to:

send a notification from the manageability controller to each manageability controller that inserted its IP address to the first DHCP response, each notification including at least the IP addresses for manageability controllers occupying a level in the hierarchy below the level occupied by the manageability controller to which the notification is sent.

26. The non-transitory machine-readable medium of any of clauses 22-25, wherein the instructions are configured to further enable the switch to:

send a notification from the manageability controller to each manageability controller that inserted its IP address in the first DHCP response, each notification including the IP addresses that were inserted by the manageability controllers.

27. The non-transitory machine-readable medium of any of clauses 22-26, wherein the switch apparatus is implemented in a sled switch.

28. The non-transitory machine-readable medium of any of clauses 22-26, wherein the switch apparatus is implemented in a tray switch.

29. The non-transitory machine-readable medium of any of clauses 22-26, wherein the switch apparatus is implemented in one of a rack switch or pod switch.

30. The non-transitory machine-readable medium of any of clauses 22-29 wherein the control plane hierarchy, from a higher level to a lowest-level, includes:
 a pod manageability controller;
 a rack manageability controller;
 a tray manageability controller; and
 a sled manageability controller.

31. The non-transitory machine-readable medium of any of clauses 22-39, wherein the first DHCP response comprises a DHCP Acknowledgement (ACK) packet, and wherein the IP addresses for the manageability controllers are added to a server option field in the DHCP ACK packet defined in RFC2132.

32. A system comprising:
 a pod, including a pod switch and a pod manageability controller,
 a rack, installed in the pod and including a rack switch and a rack manageability controller;
 a server tray installed in the rack and including a tray switch and a tray manageability controller;
 a sled, installed in the server tray, and including,
 a sled switch;
 a sled manageability controller; and
 a plurality nodes coupled to the sled switch including at least one of compute nodes and storage nodes; and
 a DHCP (Dynamic Host Control Protocol) server;

wherein the pod manageability controller, rack manageability controller, tray manageability controller and the sled manageability controller operate at respective levels in a control plane hierarchy, and wherein the system is configured to, send a first DHCP request from the sled manageability controller to the DHCP server, receive a first DHCP response at the pod switch;

insert an IP address for the pod manageability controller and forward the first DHCP response to the rack switch;

insert an IP address for the rack manageability controller and forward the first DHCP response to the tray switch;

insert an IP address for the tray manageability controller and forward the first DHCP response to the sled switch;

extract the IP addresses added by the pod, rack, and tray manageability controllers for the first DHCP response; and update control plane hierarchy information for the sled manageability controller with the IP addresses that are extracted.

33. The system of clause 32, wherein the system is further configured to:

send a second DHCP request from a DHCP client comprising one of a compute node or storage node coupled to the sled switch to the DHCP server, receive a second DHCP response in an original form at the pod switch;

insert an IP address for the pod manageability controller and forward the second DHCP response to the rack switch;

insert an IP address for the rack manageability controller and forward the second DHCP response to the tray switch;

insert an IP address for the tray manageability controller and forward the second DHCP response to the sled switch;

remove the IP addresses added by the pod, rack, and tray manageability controllers from the second DHCP response to return the second DHCP response to its original form; and forward the second DHCP response in its original form to the DHCP client.

34. The system of clause 32 or 33, wherein the system is further configured to:

send a notification from the sled manageability controller to each of the pod, rack, and tray manageability controllers, each notification including an IP address for the sled manageability controller, and the IP addresses extracted from the first DHCP response.

35. A system comprising:
 a pod, including a pod switch and a pod manageability controller,
 a rack, installed in the pod and including a rack switch and a rack manageability controller;
 a server tray installed in the rack and including,
 a tray switch;
 a tray manageability controller; and
 a plurality nodes coupled to the tray switch including at least one of compute nodes and storage nodes; and
 a DHCP (Dynamic Host Control Protocol) server;

wherein the pod manageability controller, rack manageability controller, and tray manageability controller operate at respective levels in a control plane hierarchy, and wherein the system is configured to, send a first DHCP request from the tray manageability controller to the DHCP server, receive a first DHCP response at the pod switch;

insert an IP address for the pod manageability controller and forward the first DHCP response to the rack switch;

insert an IP address for the rack manageability controller and forward the first DHCP response to the tray switch;

extract the IP addresses added by the pod and rack manageability controllers for the first DHCP response; and update control plane hierarchy information for the tray manageability controller with the IP addresses that are extracted.

36. The system of clause 35, wherein the system is further configured to:

send a second DHCP request from a DHCP client comprising one of a compute node or storage node coupled to the tray switch to the DHCP server, receive a second DHCP response in an original form at the pod switch;

insert an IP address for the pod manageability controller and forward the second DHCP response to the rack switch;

insert an IP address for the rack manageability controller and forward the second DHCP response to the tray switch;

remove the IP addresses added by the pod and rack manageability controllers from the second DHCP response to return the second DHCP response to its original form; and forward the second DHCP response in its original form to the DHCP client.

37. The system of clause 35 or 36, wherein the system is further configured to:

send a notification from the tray manageability controller to each of the pod and rack manageability controllers, each notification including an IP address for the tray manageability controller, and the IP addresses extracted from the first DHCP response.

38. A switch apparatus configured to be implemented in a data center environment having a physical hierarchy and in which an associated hierarchy of manageability controllers are implemented, the switch apparatus comprising:

a plurality of ports; and means for, implementing a manageability controller for a level in the physical hierarchy associated with the switch apparatus;

sending a first DHCP (Dynamic Host Control Protocol) request to a DHCP server, the first DHCP request including an IP (Internet Protocol) address for the manageability controller offered by the DHCP server;

receiving a first DHCP response forwarded via a second switch apparatus operating at a physical hierarchy level that is one level above the switch apparatus, the first DHCP response comprising an original DHCP response issued from the DHCP server and further including a respective IP address of at least one manageability controller operating at a level in the control plane hierarchy above the manageability controller of the switch apparatus that was added by that manageability controller to the original DHCP response message;

extracting the respective IP address of each manageability controller that added its IP address to the original DHCP response message; and updating control plane hierarchy information for the manageability controller in the switch apparatus.

39. The switch apparatus of clause 38, further comprising means for:

configuring the plurality of ports into an upstream port and a plurality of downstream ports;

receiving a second DHCP response message at the upstream port issued from a DHCP server in response to a second DHCP request made by a DHCP client occupying a level in the hierarchy below the switch apparatus and including a destination address of the DHCP client;

inserting the IP address of the manageability controller in the second DHCP response;

determining a downstream port used to forward the second DHCP response based on the destination address of the DHCP client; and forwarding the second DHCP response out of that downstream port.

40. The switch apparatus of clause 38 or 39, further comprising means for:

configuring the plurality of ports into an upstream port and a plurality of downstream ports;

receiving a third DHCP response message at the upstream port issued from the DHCP server as an original DHCP response in response to a DHCP request made by a DHCP client comprising a compute node or storage node linked in communication with the switch apparatus via a downstream port;

removing any IP addresses that were added to the original DHCP response by management controllers operating at levels in the hierarchy above the memory controller of the switch apparatus; and forwarding the original DHCP response to the compute node or storage node.

41. The switch apparatus of any of clauses 38-40, further comprising means for:

sending a notification from the manageability controller to each manageability controller that added its IP address to the first DHCP response, each notification including at least the IP addresses for manageability controllers occupying a level in the hierarchy below the level occupied by the manageability controller to which the notification is sent.

42. The switch apparatus any of clauses 38-41, wherein the switch apparatus is implemented in a sled switch.

43. The switch apparatus any of clauses 38-41, wherein the switch apparatus is implemented in a tray switch.

44. The switch apparatus any of clauses 38-41, wherein the switch apparatus is implemented in a rack switch.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'M', 'N', 'n', etc. in the foregoing detailed description and the claims are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software running on a control plane processor or software and/or firmware executed by an embedded processor in an SoC or the like. Thus, embodiments of this invention may be used as or to support a software program, software modules, firmware, and/or distributed software executed upon some form of processing core (such as the CPU of a computer, one or more cores of a multi-core processor or SoC), a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A switch apparatus configured to be implemented in a data center environment having a control plane hierarchy in which an associated hierarchy of manageability controllers are implemented, the switch apparatus comprising:
   a plurality of ports;
   a processor;
   memory, operatively coupled to the processor; and
   a storage device having instructions stored therein that are configured to be executed by the processor to enable the switch apparatus to,
      implement a first manageability controller for a level in the control plane hierarchy associated with the switch apparatus;
      receive a first DHCP (Dynamic Host Control Protocol) request from a second manageability controller operating at a control plane hierarchy level that is one level below the switch apparatus, the first DHCP request made by a requesting DHCP client comprising one of a lowest manageability controller in the hierarchy of manageability controllers, a compute node, or a storage node and including a destination address of the requesting DHCP client;
      forward the first DHCP request to a third switch apparatus operating at a control plane hierarchy level that is one level above the switch apparatus;
      receive a first DHCP response forwarded via the third switch apparatus, the first DHCP response comprising an original DHCP response issued from a DHCP server and further including a respective IP address of at least one manageability controller operating at a level in the control plane hierarchy above the manageability controller of the switch apparatus that was added by that manageability controller to the original DHCP response message;

insert the IP address of the manageability controller of the switch apparatus in the first DHCP response; and forward the first DHCP response to the second manageability controller.

2. The switch apparatus of claim 1, wherein the instructions are configured to further enable the switch apparatus to:

configure the plurality of ports into an upstream port and a plurality of downstream ports;

receive a second DHCP response message at the upstream port issued from a DHCP server in response to a second DHCP request made by a DHCP client occupying a level in the hierarchy below the switch apparatus and including a destination address of the DHCP client;

insert the IP address of the manageability controller of the switch apparatus in the second DHCP response;

determine a downstream port used to forward the second DHCP response based on the destination address of the DHCP client; and forward the second DHCP response out of that downstream port.

3. The switch apparatus of claim 1, wherein the instructions are configured to further enable the switch apparatus to:

receive a notification from the second manageability controller including the respective IP address of each manageability controller operating at a level in the control plane hierarchy above the manageability controller of the switch apparatus that added its IP address to the original DHCP response message;

extract the respective IP address of each manageability controller that added its IP address to the original DHCP response message; and update control plane hierarchy information for the manageability controller of the switch apparatus with information that associates each manageability controller that added its IP address to the original DHCP response message with its respective IP address.

4. The switch apparatus of claim 1, wherein the switch apparatus is implemented in one of a rack switch or a pod switch.

5. The switch apparatus of claim 1, wherein the control plane hierarchy, from a higher level to a lowest-level, includes:

a pod manageability controller;
a rack manageability controller;
a tray manageability controller; and
a sled manageability controller.

6. The switch apparatus of claim 1, wherein the first DHCP response comprises a DHCP Acknowledgement (ACK) packet, and wherein the IP address for the manageability controller of the switch apparatus is inserted into a server option field in the DHCP ACK packet defined in RFC2132.

7. A non-transitory machine-readable medium having instructions configured to be executed by a processor in a switch apparatus configured to be implemented in a data center environment having a control plane hierarchy in which an associated hierarchy of manageability controllers are implemented, wherein the instructions, when executed, enable the switch apparatus to:

implement a first manageability controller for a level in the control plane hierarchy associated with the switch apparatus;

receive a first DHCP (Dynamic Host Control Protocol) request from a second manageability controller operating at a control plane hierarchy level that is one level below the switch apparatus, the first DHCP request made by a requesting DHCP client comprising one of a lowest manageability controller in the hierarchy of manageability controllers, a compute node, or a storage node and including a destination address of the requesting DHCP client;

forward the first DHCP request to a third switch apparatus operating at a control plane hierarchy level that is one level above the switch apparatus;

receive a first DHCP response forwarded via the third switch apparatus, the first DHCP response comprising an original DHCP response issued from a DHCP server and further including a respective IP address of at least one manageability controller operating at a level in the control plane hierarchy above the manageability controller of the switch apparatus that was added by that manageability controller to the original DHCP response message;

insert the IP address of the manageability controller of the switch apparatus in the first DHCP response; and forward the first DHCP response to the second manageability controller.

8. The non-transitory machine-readable medium of claim 7, wherein the instructions are configured to further enable the switch apparatus to:

configure the plurality of ports into an upstream port and a plurality of downstream ports;

receive a second DHCP response message at the upstream port issued from a DHCP server in response to a second DHCP request made by a DHCP client occupying a level in the hierarchy below the switch apparatus and including a destination address of the DHCP client;

insert the IP address of the manageability controller of the switch apparatus in the second DHCP response;

determine a downstream port used to forward the second DHCP response based on the destination address of the DHCP client; and forward the second DHCP response out of that downstream port.

9. The non-transitory machine-readable medium of claim 7, wherein the instructions are configured to further enable the switch apparatus to:

receive a notification from the second manageability controller including the respective IP address of each manageability controller operating at a level in the control plane hierarchy above the manageability controller of the switch apparatus that added its IP address to the original DHCP response message;

extract the respective IP address of each manageability controller that added its IP address to the original DHCP response message; and update control plane hierarchy information for the manageability controller of the switch apparatus with information that associates each manageability controller that added its IP address to the original DHCP response message with its respective IP address.

10. The non-transitory machine-readable medium of claim 7, wherein the switch apparatus is implemented in one of a rack switch or pod switch.

11. The non-transitory machine-readable medium of claim 7, wherein the control plane hierarchy, from a higher level to a lowest-level, includes:

a pod manageability controller;
a rack manageability controller;

a tray manageability controller; and a sled manageability controller.

12. The non-transitory machine-readable medium of claim 7, wherein the first DHCP response comprises a DHCP Acknowledgement (ACK) packet, and wherein the IP addresses for the manageability controller of the switch apparatus is inserted into a server option field in the DHCP ACK packet defined in RFC2132.

* * * * *